United States Patent [19]

Filmer

[11] 4,368,735
[45] Jan. 18, 1983

[54] ANIMAL EAR TAG APPLICATORS

[75] Inventor: David B. Filmer, Newport, Australia

[73] Assignee: Agri Plastics International Pty. Limited, Newport, Australia

[21] Appl. No.: 125,062

[22] Filed: Feb. 27, 1980

[30] Foreign Application Priority Data

Mar. 9, 1979 [AU] Australia ............................ PD7978

[51] Int. Cl.³ ............................................ A01K 11/00
[52] U.S. Cl. ..................................... 128/330; 227/144
[58] Field of Search .................. 128/330, 316; 40/300, 40/301, 302; 227/144, 140

[56] References Cited

U.S. PATENT DOCUMENTS 4,120,303 10/1978 Villa-Massone et al. ........... 128/330
4,201,214 5/1980 Whiteley .............................. 128/330

FOREIGN PATENT DOCUMENTS 464848 7/1974 Australia .............................. 128/330
746412 3/1956 United Kingdom ................ 227/144

Primary Examiner—Michael H. Thaler
Attorney, Agent, or Firm—Ladas & Parry

[57] ABSTRACT

An applicator for an animal ear tag having a pliers-type action which has an ear-piercing pin member attached to the jaws, the pin member being capable of pivoting in a direction away from the jaws when closed.

2 Claims, 7 Drawing Figures

ANIMAL EAR TAG APPLICATORS

This invention is concerned with applicators for animal ear tags and is more particularly concerned to provide improvements in relation to a known such applicator.

The known applicator is the subject of Australian Pat. No. 464,848, the specification of which patent is incorporated herein by reference.

The said known applicator works effectively but is subject to a particular disadvantage in that when it is used to place an ear tag the operator must open the jaws of the device very quickly after placing the tag, otherwise the animal may suffer a tearing of its ear. This possibility arises since the first reaction of an animal when its ear is pierced by such an applicator is to rapidly withdraw its ear from the applicator and the pin member of the applicator is rigidly fixed to one jaw of the plier-like applicator.

It is an object of this invention to ameliorate the stated disadvantage of the said known applicator.

Broadly, the object of this invention is achieved by providing a pivot between the pin member and the jaw member to which the pin is affixed in the known device.

More specifically this invention in one broad form provides an applicator for an animal ear tag having a pliers-type action, said applicator comprising spring means biasing the handles thereof away from each other, a pin member having an ear-piercing free end associated with a first jaw member of said applicator, the second jaw having a recess therein and an aperture through the jaw from the recess, a slotted plate pivoted between its ends on said second jaw, the end thereof opposite the slotted end being spring loaded to said second jaw said slot and said recess being aligned and the pin member being arranged to enter said aperture when said handles are closed, characterised by a pivot between said pin member and said first jaw and means for permitting pivot actuation when said handles are closed so that said pin member may pivot in said slot in a direction away from the closed jaws.

By way of example only, two embodiments of an applicator according to this invention will now be described with reference to the accompanying drawings wherein.

Figure 1:
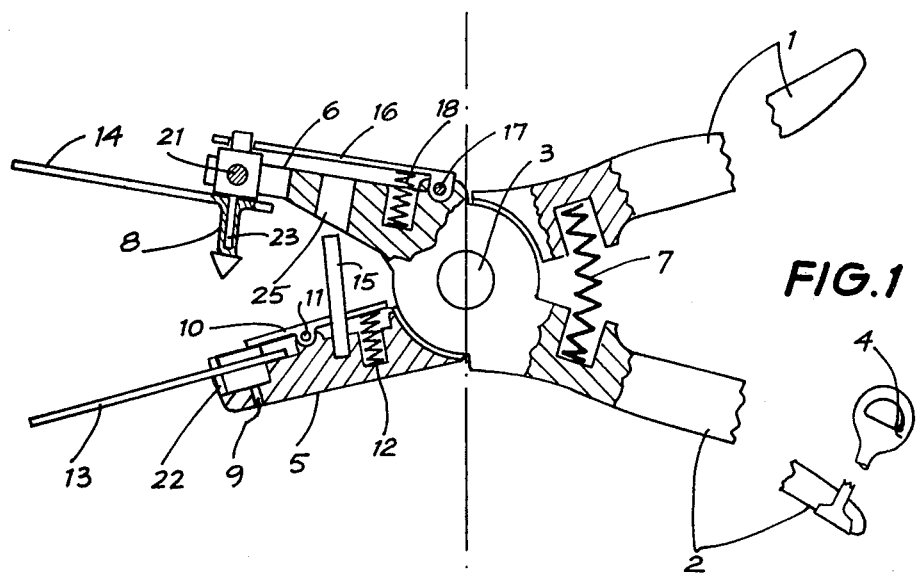
FIG. 1 is a sectional side view of a first embodiment of an improved applicator according to this invention in its open position.
Figure 2:
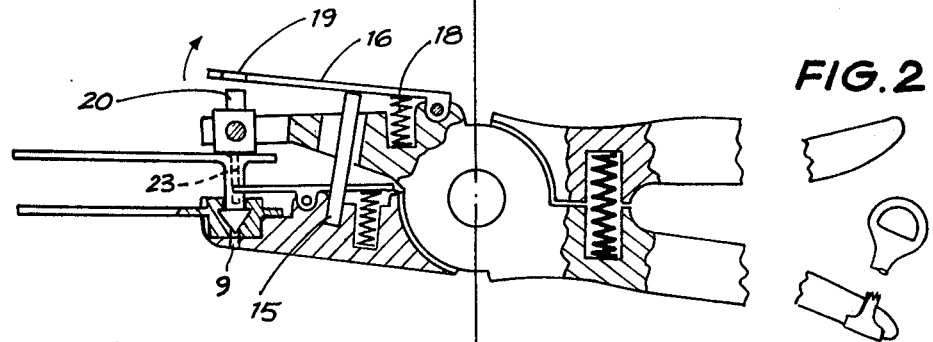
FIG. 2 is a sectional side view of the applicator of FIG. 1 in its closed position before pivoting of the pin member.
Figure 3:
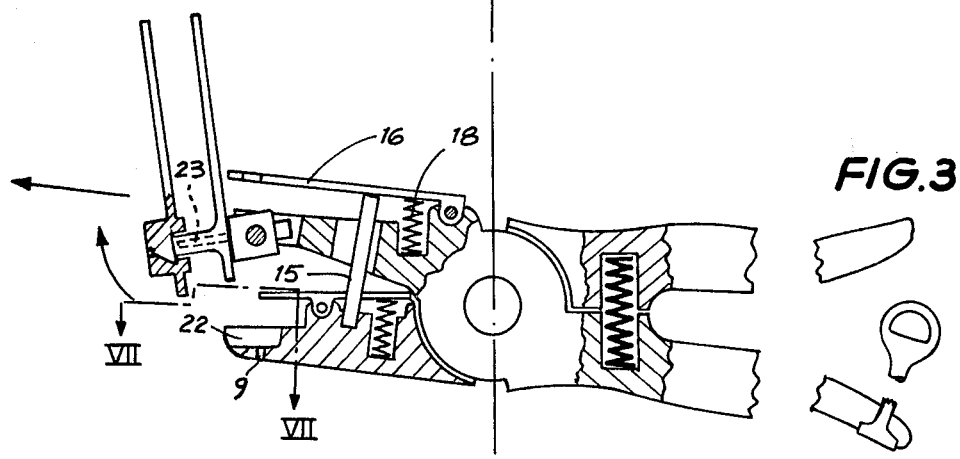
FIG. 3 is a similar view to that shown in FIG. 2, after the pin member has pivoted away from the closed jaws.

Referring to FIGS. 1 to 3, the applicator of this embodiment comprises handles 1 and 2 biased away from each other by spring 7. The central pivot 3 of the device is disposed between handles 1 and 2 and jaws 5 and 6. Upper jaw 6 has pin 23 depending therefrom adjacent the outer extremity of jaw 6. Pin 23 is pivoted at 21 to upper jaw 6.

Lower jaw 5 is provided with a recess 22 and its outer end and aperture 9 extends from this recess 22 through jaw 5 such that pin 23 will enter aperture 9 when handles 1 and 2 are closed.

Pin 23, in an ear tagging operation, carries male tag 14 which incorporates spear member 8. Female tag 13 is disposed, in part, in recess 22 and before closure of handles 1 and 2, is held in position on lower jaw 5 by slotted plate 10 which is pivoted at 11 to lower jaw 5 and spring 12 acts on plate 10 so as to effect retention of tag 13 in location on lower jaw 5. The slot 10a in plate 10 is such as to allow pin 23 and spear member 8 to readily enter aperture 9.

When a tagging operation is effected, lower jaw 5 with female tag 13 may be placed in position either behind or in front of an animal's ear whilst handles 1 and 2 are open. The handles are then closed so that spear members 8 pierces female tag 13 and tag 14 becomes fixed to the opposite side of the ear from tag 13, the shank of spear 8 being disposed through the ear.

The applicator of this invention incorporates a bar member 16 pivoted as at 17 to the outer side of upper jaw 6. Bar 16 is provided with an aperture 19 configured to fit snugly around extended portion 20 (FIG. 2) of pivot 21 when handles 1 and 2 are open and tension spring 18 is in its rest position. Upper jaw 6 is further provided with aperture 25 and lower jaw 5 is provided with fixed rod 15 which is adapted to traverse aperture 25 during closure of handles 1 and 2. Rod 15 is of such length that when handles 1 and 2 are closed (see FIG. 2) it forces bar 16 against spring 18 so that aperture 19 is disengaged from location around pivot extension 20 thus freeing pin 23 to pivot relative to upper jaw 6.

Clearly a tagged animal will pull its ear away from the applicator with the result that the engaged male 14 and female 13 tags will pivot away from the jaws 5 and 6 to a location as indicated in FIG. 3.

During or at the end of this pivotal movement, the spear member 8 will become disengaged from pin 23. The man skilled in the art will appreciate that a tagging operation may be completed without any further action of the operator. This confers on the apparatus of this invention a considerable advantage over prior art devices lacking in the pivotting capacity exhibited by the tag relative to the closed jaws of this device, after the ear is tagged. It is clear that this apparatus enables a tagging operation to be completed whilst the handles and jaws remain closed. In prior art devices considerable speed and skill are required of an operator in that as soon as a beast is tagged with the prior art device in the fully closed position, only a fraction of a second may elapse before the pliers must be reopened by the operator, since the instant reaction to tagging by a beast is to pull its ear away from the tagging implement.

It will be appreciated that the pivotting of pin 23 relative to jaw 6 greatly lessens the prospect of tearing of the animal's ear which can result from slow opening of handles 1 and 2 after tagging has been effected.

Figure 4:
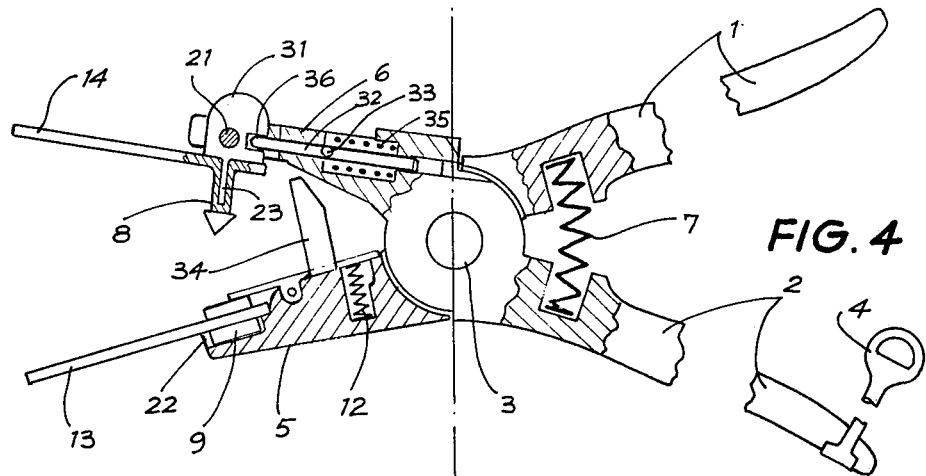
FIG. 4 is a sectional side view of the further embodiment of an improved applicator according to this invention in its open position.
Figure 5:
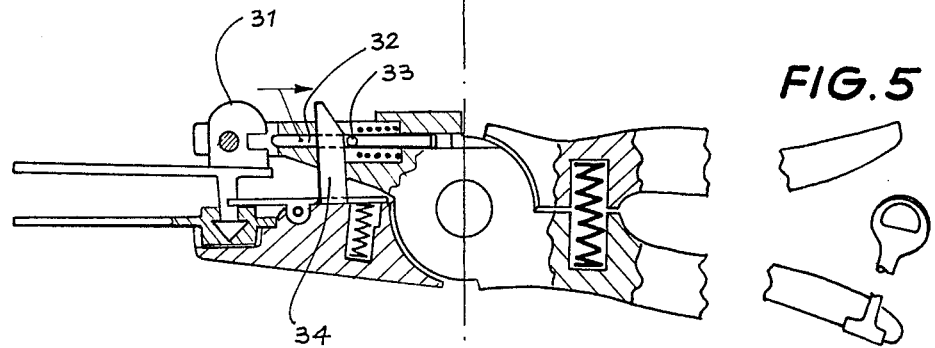
FIG. 5 is a sectional side view of the applicator of FIG. 4 in its closed position before pivotting of the pin member.
Figure 6:
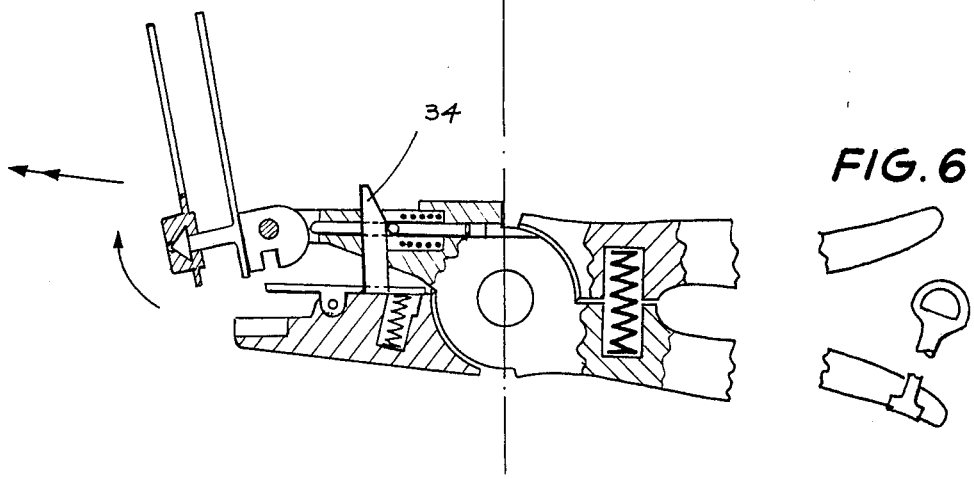
FIG. 6 is a similar view to that shown in FIG. 5, after the pin member has pivotted away from the closed jaws.
Figure 7:
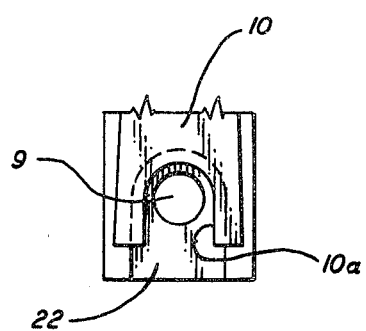
FIG. 7 is a section along the line VII—VII of FIG. 3.

In FIGS. 4, 5 and 6 corresponding parts of the apparatus are numbered identically to FIGS. 1, 2 and 3. However, in this embodiment an alternative means is depicted for permitting actuation of the pin member pivot arrangement. In this embodiment pivot 21 is provided with a curved cap member 31 which incorporates keyhole 36. When applicator handles 1 and 2 are open the pivot pin member is locked in a position as shown in FIG. 4 by retention of sliding bolt 32 in keyhole 36, compression spring 35 acting against bolt 32 to ensure this locking engagement. Bolt 32 is provided with lug 33 and tapered pin 34 is fixed to lower jaw 5. As handles 1 and 2 are closed tapered pin 34 engages lug 33 and forces bolt 32 against spring 35 and out of engagement with keyhole 36. This frees moving head 31 and attached pin 23 to pivot, as shown in FIG. 6, away from jaws 5 and 6 where handles 1 and 2 are closed and a tagging operation is completed. When handles 1 and 2 are reopened, tapered pin 34 disengages bolt lug 33 and compression spring 35 forces bolt 32 into engagement with the rounded circumference of moving head 31. A new tag may then be located on pin 23 and head 31 rotated manually so that bolt 32 engages keyhole 36 and the applicator resumes its position ready for a further tagging operation.

What I claim is:

1. An applicator for an animal ear tag, said applicator including first and second jaw members, first and second handles respectively extending from and being integral with said first and second jaw members with the handles and jaw members being pivotally interconnected to perform a pliers-type action, spring means biassing the handles away from each other, a pin member pivotally mounted on said first jaw member for movement between an engage position directed toward the second jaw member and a release position, a recess and aligned aperture in said second jaw member to receive said pin member in said engage position, a locking bar pivotally mounted on a side of said first jaw member remote from said second jaw member and having an aperture dimensioned to seat over an extension of said pin and lock said pin in the engage position when the jaw members are open, a release rod mounted on the second jaw member and directed towards the first jaw member, said release rod being arranged to engage the locking bar when the jaw members are closed and pivot said locking bar to unseat the aperture from the pin extension and thereby permit pivotal movement of said pin to the release position, a plate pivotally mounted on the second jaw member, one end of said plate being slotted and said plate being spring biassed to urge said slotted end toward the second jaw member to overlie the recess and aperture and provide a passage for said pin member.

2. An applicator according to claim 1, wherein the locking bar is maintained in the pin member locking position by spring means.

* * * * *